United States Patent Office 2,875,121
Patented Feb. 24, 1959

2,875,121

INSECTICIDE FORMULATIONS

Leo Trademan, Marshall A. Malina, and Louis P. Wilks, Chicago, Ill., assignors to Velsicol Chemical Corporation, a corporation of Illinois No Drawing. Application December 16, 1954
Serial No. 475,840

4 Claims. (Cl. 167—30)

This invention relates to insecticide compositions and to methods of stabilizing them. More particularly, the present invention relates to dry formulations of certain halogenated insecticides.

Dry formulations of halogenated insecticides fall into three main classifications, namely dusts, wettable powders, and granular formulations. Dusts and granular formulations differ primarily in particle size of the carrier or diluent used. For example, a typical dust formulation may comprise an insecticide dispersed in a solid carrier having a particle size smaller than about 325 mesh. A typical granular formulation would comprise an insecticide dispersed in a solid carrier having a particle size of about 20–80 mesh. A typical wettable powder comprises an insecticide and a solid carrier having a particle size of the order of that used for dust formulations, in conjunction with wetting and dispersing agents.

Typically, a granular formulation may contain from about 2% to about 35% insecticide by weight. This type of formulation is generally used as such without further dilution with an insecticidally inert carrier in such fields as agriculture.

Typically, a dust formulation can contain about 0.25% insecticide up to about 50% insecticide by weight. Frequently, the dust formulations are first prepared as so-called "concentrates" which contain typically from about 10% to about 50% insecticide dispersed in the dust, and such "concentrate" is further diluted to a so-called "field strength" dust typically having an insecticide concentration of about 0.25% to about 5%, varying with the use desired and the potency of the toxicant.

The wettable powders typically contain a concentration of toxicant on the order of that contained in dust concentrates as above described. However, they are diluted to "field strength" by dispersing in water rather than by dispersing in dust.

The toxicant ingredient of the dry insecticide formulations which is stabilized by the present invention is selected from that class of insect toxicants which are derived from hexachlorocyclopentadiene and which are specifically typified by chlordane, heptachlor, aldrin, isodrin, dieldrin or endrin, either in their pure or technical form.

The carriers or diluents generally used with these insect toxicants, and which in their normal state are active in deteriorating the aforesaid class of toxicants when mixed therewith without treatment as specified in the present invention, are solids of the class consisting of kaolin clays, montmorillonite clays, attapulgite clays, diatomaceous earths and vermiculites.

Kaolins such as kaolinite, dickite, nacrite, anuxite, halloysite and endellite are useful as carrier materials. Montmorillonites, such as beidellite, nontronite, montmorillonite, hectorite, saponite, sauconite and bentonite are useful as carrier materials. Attapulgites such as fuller's earth, attapulgite and sepiolite are useful as carrier materials. Diatomaceous earths such as diatomite and kieselguhr are useful as carrier materials. Vermiculites such as biotite are useful as carrier materials.

Having now described the types of formulations herein concerned, the insect toxicants employed, and the carriers and diluents used, a brief discussion of the problem encountered in such formulations will be helpful in understanding the present invention.

While the solid carriers above discussed are very useful in formulating the herein defined toxicants for reasons of their inexpensiveness, availability, ease of handling, absorbency characteristics, durability and other desirable physical properties, they have the disadvantageous property, to varying degrees, of degrading or decomposing the insect toxicant when intimately mixed therewith. While this degrading action is a slow process, it is significant and troublesome since dry formulations are often prepared as concentrates or even field strength materials and then stored for periods which may be as long as a year or more. During this storage period the effect of the carrier or diluent on the insect toxicant ingredient may reduce its effectiveness to the point where satisfactory insect control under field conditions is no longer obtainable.

The nature of the reaction or effect of the carriers on the chlorinated insecticide has never been fully elucidated. The rate of toxicant deterioration may vary by the action of different carriers or diluents.

To solve the present problem it has been found necessary to neutralize the activity of the solid carriers and diluents so that they are inert to the insect toxicant and will allow protracted storage of dry insecticide formulations without deterioration of insecticidal activity of such formulation.

Since the formulations herein concerned are used preponderantly in agriculture, any treatment of the carriers and diluents used must necessarily not render the formulation unfit for agricultural use on food and forage crops at time of harvest. Thus, the treatment must not render the formulation phytotoxic. The treatment must likewise not be hazardous from a warm-blooded animal toxicity standpoint, or otherwise increase the hazard in the utilization of insecticide formulations. Also, of primary importance, and considering the economics involved, the treatment must not involve expensive materials, nor can the process of treatment be complex. Another consideration in the present problem is that the treatment must not affect the insecticidal activity of the toxicant employed.

It is therefore an object of the present invention to provide an additive to dry insecticide formulations which will prevent deterioration of the insect toxicant ingredient during storage.

It is another object of the present invention to provide an additive to dry insecticide formulations, for the purpose of stabilizing them, which is neither acidic nor basic, and which is relatively nontoxic.

It is another object of the present invention to provide an additive to dry insecticide formulations, for the purpose fo stabilizing them, which is not deleterious to plant life.

Further, it is an object of the present invention to stabilize dry insecticide formulations by inexpensive means and by use of readily available ingredients.

It has now been discovered that the solid carriers and diluents which were previously described and which are active in deteriorating the class of insecticides herein concerned can be rendered substantially inert by the addition thereto of a small quantity of organic compounds selected from the group consisting of acetone, diacetone alcohol and isopropanol.

It is surprising and unexpected that these materials should be as effective as they are, since they are neutral insofar as pH is concerned and their stabilizing effect in the present instance could not be predicted from the prior art.

The above described organic compounds have the beneficial effect of alleviating or eliminating degradation or deterioration of the insect toxicant ingredient in dry insecticide formulations when contained in such formulation in amounts varying between about 2% to about 14% by weight based on the weight of carrier or diluent contained in the formulation. A preferred concentration of oxygen-containing additive to dry insecticide formulations is about 5% to about 10% by weight based on the weight of carrier or diluent.

The art of blending materials with solid carriers and diluents of the class herein described is well known, and the liquid additives of the present invention can be blended with these solid materials by any known means. For example, the use of commercial type mixers or blenders is adequate. The present compounds can be added to and blended with the solid carriers either alone or in combination with an inert, relatively volatile solvent which can be removed after blending.

The present organic additives can be added to and blended with the solid carriers prior to blending the insect toxicant therewith.

In the alternative, the additives can be added to the solid carriers during the same blending operation wherein mixing of the insect toxicant and carrier is achieved. It is preferred to preblend the additive to the carrier before blending the insect toxicant.

The following specific information exemplifies the beneficial effect of the present oxygenated additives herein disclosed, using acetone and kaolin dust of size to pass through a 325-mesh screen as representative of the solid carriers, and heptachlor as representative of the insect toxicant.

Acetone (10 wt. percent based on weight of clay) was blended with Barden clay (a trade name for a kaolin) by mixing and blending for ten minutes in a standard dry blender. The thus impregnated kaolin dust was then used as a carrier to prepare a 10% heptachlor concentrate. This was accomplished by standard blending technique. The final formulation had the following composition:

10.3 wt. percent heptachlor
80.73 wt. percent Barden clay (kaolin)
8.97 wt. percent acetone Another formulation containing 9.5 wt. percent heptachlor and having the following composition was prepared using the same Barden clay (kaolin) without treatment with acetone:

9.5 wt. percent heptachlor
90.5 wt. percent Barden clay

These two formulations were then subjected to accelerated storage tests in an oven maintained at 122° F. After thirty days of such aging, the formulation not containing acetone had deteriorated to such extent that a spectrophotometric analysis showed it contained only 4.0% heptachlor. On the other hand, the formulation containing acetone was unchanged with respect to heptachlor concentration after thirty days of accelerated aging.

A similar series was made up in the same manner as that described for Barden clay, using other dry carriers and other stabilizers in place of acetone. These formulations are illustrated as to composition and stability in the following table:

TABLE

*Heptachlor concentrations*

[Determined spectrophotometrically.]

| Stabilizer and Concentration | Initial | After 30 days' oven aging at 122° F. | Carrier |
|---|---|---|---|
|  | 10.7 | 0.6 | Attapulgite, granular. |
| 10% acetone | 10.1 | No change | Do. |
|  | 27.4 | 21.5 | Attapulgite, dust. |
| 10% acetone | 26.1 | 24.0 | Do. |
|  | 10.0 | 4.8 | Barden clay (kaolin). |
| 5% acetone | 10.3 | No change | Do. |
| 10% isopropanol | 10.7 | do | Attapulgite, granular. |
| 7% diacetone alcohol | 10.4 | do | Do. |

It is evident from a review of the table that the use of 5% and 10% of the present organic compounds based on weight of carrier is effective in eliminating or alleviating decomposition of technical heptachlor formulated with attapulgites and kaolins respectively. The untreated formulations deteriorated on storage; whereas the treated formulations remained at full strength on storage. While the above table specifically illustrates the use of the present stabilizers on heptachlor formulations, other members of the broad class of insect toxicants derived from hexachlorocyclopentadiene can be equally benefited.

These organic compounds are valuable for use on the carriers previously mentioned and represented by the classes attapulgites, kaolins, montmorillonites, diatomaceous earths, and vermiculites. These stabilizers are effective on these carriers regardless of the particle size thereof or formulation type, such as whether they be in a dust form, wettable powder form or granular form.

As previously stated, these stabilizers are useful in stabilizing dry formulations of the class dusts, wettable powders and granular formulations of those polychlorinated insect toxicants derived from hexachlorocyclopentadiene and typified by endrin, aldrin, isodrin, dieldrin, heptachlor, and chlordane.

We claim:

1. A stabilized insecticidal composition comprising in combination: an insect toxicant derived from hexachlorocyclopentadiene selected from the group consisting of endrin, isodrin, aldrin, dieldrin, chlordane, and heptachlor; a finely divided solid carrier active in deteriorating said insect toxicant mixed therewith selected from the group consisting of kaolin clay, montmorillonite clay, attapulgite clay, diatomaceous earth and vermiculite; and between 2% and 14% by weight of the carrier of an organic compound which alleviates said deterioration of the insect toxicant selected from the group consisting of diacetone alcohol, and isopropanol.

2. A stabilized insecticidal composition comprising in combination: heptachlor; a finely divided solid carrier active in deteriorating said insect toxicant mixed therewith selected from the group consisting of kaolin clay, montmorillonite clay, attapulgite clay, diatomaceous earth, and vermiculite; and between 2% and 14% by weight of the carrier of an organic compound which alleviates said deterioration of the insect toxicant selected from the group consisting of diacetone alcohol, and isopropanol.

3. A stabilized insecticidal composition comprising in combination: endrin; a finely divided solid carrier active in deteriorating said insect toxicant mixed therewith selected from the group consisting of kaolin clay, montmorillonite clay, attapulgite clay, diatomaceous earth, and vermiculite; and between 2% and 14% by weight of the carrier of an organic compound which alleviates said deterioration of the insect toxicant selected from the group consisting of diacetone alcohol, and isopropanol.

4. A stabilized insecticidal composition comprising in combination: chlordane; a finely divided solid carrier active in deteriorating said insect toxicant mixed therewith selected from the group consisting of kaolin clay, montmorillonite clay, attapulgite clay, diatomaceous earth, and vermiculite; and between 2% and 14% by weight of the carrier of an organic compound which alleviates said deterioration of the insect toxicant selected from the group consisting of diacetone alcohol, and isopropanol.

References Cited in the file of this patent

UNITED STATES PATENTS

| | | |
|---|---|---|
| 2,371,644 | Petering | Mar. 20, 1945 |
| 2,407,149 | Gardenier | Sept. 3, 1946 |
| 2,579,301 | Buntin | Dec. 18, 1951 |
| 2,722,557 | Danison | Nov. 1, 1955 |

FOREIGN PATENTS

| | | |
|---|---|---|
| 624,176 | Great Britain | May 30, 1949 |
| 692,546 | Great Britain | June 10, 1953 |

OTHER REFERENCES

Watkins: Handbook of Insecticide Dust Diluents and Carriers, Dorland Books (1955), pp. 57–70, 96–100, 161–200, 136–160 and 200–214.

Roark: U. S. Dept. of Agri. Publ. E–817 (April 1951), p. 11.